United States Patent [19]

Nomura et al.

[11] Patent Number: 4,666,883

[45] Date of Patent: May 19, 1987

[54] SELECTIVE SEPARATION OF BORATE IONS IN WATER

[75] Inventors: Junji Nomura; Yuzuru Ishibashi; Akira Kaneda, all of Fuji, Japan

[73] Assignee: Asahi Kasei Kogyo Kabushiki Kaisha, Osaka, Japan

[21] Appl. No.: 808,581

[22] Filed: Dec. 13, 1985

Related U.S. Application Data

[62] Division of Ser. No. 570,322, Jan. 13, 1984, Pat. No. 4,596,659.

[30] Foreign Application Priority Data

Jan. 18, 1983 [JP] Japan .................................. 58-6497
Jul. 4, 1983 [JP] Japan ................................ 58-121245

[51] Int. Cl.$^4$ .............................................. C02F 1/28
[52] U.S. Cl. .................................. 502/402; 502/400
[58] Field of Search ............... 502/400, 402, 159, 302, 502/303, 304

[56] References Cited

U.S. PATENT DOCUMENTS

| | | | |
|---|---|---|---|
| 2,369,074 | 2/1945 | Pitzer | 502/303 X |
| 3,545,917 | 12/1970 | Stephens | 502/303 X |
| 4,034,047 | 7/1977 | Angstadt | 502/159 X |
| 4,045,371 | 8/1977 | Wheelock et al. | 502/400 |
| 4,331,565 | 5/1982 | Schaefer et al. | 502/304 |

FOREIGN PATENT DOCUMENTS 5839 1/1976 Japan .

OTHER PUBLICATIONS

Toshi Tomizawa, "Denki Kagaku", pp. 339-342, 349. No. 6 (1981) publication.
Rohm and Haas Company publication, Dec. 1965.
E. Hayek and H. Schimann, Mh. Chem., Bd. 88, H. 4/1957, pp. 686-691.
M. Abe and T. Ito, Nippon Kagaku Zasshi, pp. 1259-1266, 86, No. 12, (1965).

*Primary Examiner*—Patrick P. Garvin
*Attorney, Agent, or Firm*—Sprung Horn Kramer & Woods

[57] ABSTRACT

Borate ions dissolved at low concentration in water are separated efficiently with the use of a hydroxide or hydrous oxide of a rare earth element as the adsorbent. By contacting a borate ion-containing water with the absorbent, borate ions are separated by adsorption, and the adsorbent having adsorbed borate ions is desorbed and the regenerated for reuse with a desorbing solution adjusted to pH about 2 to about 4 or pH about 12 to about 14.

6 Claims, 2 Drawing Figures

SELECTIVE SEPARATION OF BORATE IONS IN WATER

This is a division of application Ser. No. 570,322, filed Jan. 13, 1984, now U.S. Pat. No. 4,596,659.

BACKGROUND OF THE INVENTION

1. Field of the Invention

This invention relates to a process for separating boric acid compounds dissolved in water, particularly borate ions from an aqueous solution containing boric acid compounds at a low concentration such as sea water, with good selectivity and at high efficiency.

2. Description of the Prior Art

Borate ions exist natively in minute amounts in natural rivers, lakes or ponds, sea water and underground brine. When such water sources are utilized for agricultural purposes, the presence of boron at a level of 5 ppm or higher has been known to be detrimental to growth of agricultural crops.

Also, in the production of magnesium hydroxide from sea water, boric acid compounds dissolved in sea water at a level of 4 to 5 ppm as boron are co-precipitated with magnesium hydroxide, whereby the quality of refractory bricks produced by use of such magnesium hydroxide such as heat resistance will be lowered. Since these borate ions dissolved in minute amounts in water are overwhelmingly smaller in amount as compared to other co-existing anions, it is very difficult to selectively remove only borate ions.

Heretofore, as methods for separation of boric acid compounds dissolved in water, there have been proposed methods involving adsorption separation, using, for example, an anion exchange resin, or a chelate resin such as a boron-selective resin derived from a polyvalent alcohol or a metal hydroxide such as magnesium hydroxide or a hydrous zirconium oxide. However, the boric acid concentration is so low as 4 to 10 ppm as boron, and also due to the co-presence of a large amount of various ions, the above described methods are insufficient in boron selectivity or adsorbability. Thus, under the present situation, no economically effective method has been so far known.

SUMMARY OF THE INVENTION

The present invention provides a process for the selective adsorption separation of borate ions dissolved in water, which comprises contacting the borate ion-containing water having a pH of about 5 to about 11 with an adsorbent comprising a hydroxide or a hydrous oxide of a rate earth element and separating the adsorbent having the borate ions adsorbed thereon from the water. According to a preferred embodiment of the invention, the adsorbent having the borate ions adsorbed thereon is further contacted with an aqueous solution having a pH of about 2 to about 4 or a pH of about 12 to about 14 thereby to desorb the borate ions for regeneration and reuse of the adsorbent.

DETAILED DESCRIPTION OF THE INVENTION

Figure 1:
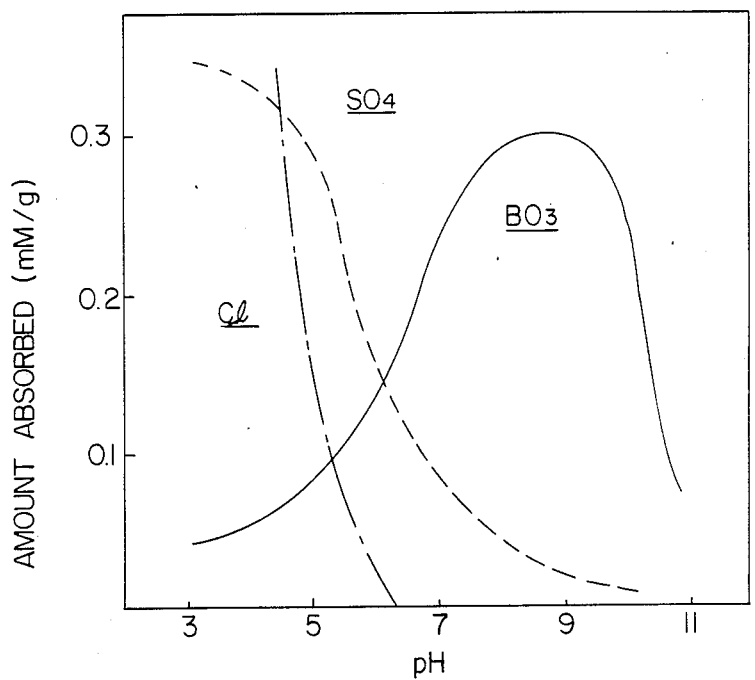
FIG. 1 shows pH dependencies of the amounts of borate ion, sulfate ion and chloride ion adsorbed in sea water on hydrous cerium (IV) oxide according to the present invention.

An object of the present invention is to provide a process for efficiently separating borate ions from water containing borate ions dissolved therein at a low concentration, particularly a process for selectively and efficiently removing a minute amount of borate ions co-existing with various cations and anions in an aqueous solution.

Another object of the present invention is to provide a process for efficiently separating borate ions by adsorption and also an economical method for regeneration of the adsorbent comprising specific steps of adsorption and desorption.

Still another object of the present invention is to provide an adsorbent for borate ions dissolved in water.

A further object of the present invention is to provide a method of preparing an adsorbent for borate ions dissolved in water.

According to the present invention, for example, in the step of producing magnesium hydroxide from sea water, brine or bittern, borate ions can be removed by separation from the water employed, followed by practicing of the method known in the art, entrainment of boron compounds in magnesium hydroxide can markedly be reduced.

The term "brine" as mentioned herein refers to a solution which is not saturated with sodium chloride when sea water is concentrated, and a solution which contains sodium chloride but is not saturated therewith such as underground brine, and the term "bittern" refers to a residual solution after removing sodium chloride from sea water by dialysis or other methods.

The hydroxides and hydrous oxides of rare earth elements which can be employed in this invention include all the compounds obtained by hydroxylation of the metals of rare earth elements, namely Y, La, Ce, Pr, Nd, Pm, Sm, Eu, Gd, Tb, Dy, Ho, Er, Tm, Yb and Lu, and oxides thereof and salts thereof. Of the rate earth elements, La, Ce, Y and Sm are preferred. Above all, Ce (IV) is more preferred on account of its greater adsorption capacity as well as its solubility in water which is negligibly small.

These hydroxides or hydrous oxides of these rate earth elements can be used either as individual species or as a mixture of two or more species.

Further, the hydroxides and hydrous oxides of rare earth elements which can also be employed include complex hydrous oxides of rare earth elements formed during the hydroxylation of rare earth elements in the co-presence of various kinds of metal ions. Examples of such metals which can be co-present include Al, Cr, Co, Ga, Fe, Mn, Ni, Ti, V, Sn, Zr, Hf, Ge, Nb and Ta. Preferably, the amount of the co-present metals is not more than 50%.

In addition, cations or anions to be employed during the hydroxylation may also be co-present with the hydroxides and hydrous oxides of rare earth elements of this invention in the form of compounds conjugated thereto as a part of its structure. Examples of such cations and anions which can be co-present are $NH_4^+$, $Na^+$, $K^+$, $Ca^{2+}$, $SO_4^{2-}$, $NO_3^-$, $F^-$, $Cl^-$, $PO_4^{3-}$ and mixture tereof.

Further, the hydroxides and hydrous oxides of the present invention may also be employed together with other substances such as active carbon, active alumina, hydrous zirconium oxide, hydrous titanium oxide and others.

The chemical structures of the hydroxide and hydrous oxice of a rear earth element of the present invention are not clear but may be assumed to be any of $Ln(OH)_3 \cdot xH_2O$, $Ln_2O_3 \cdot xH_2O$, $[Ln_2O_a(OH)_{6-2a} \cdot xH_2O]_n$ for trivalent rare earth elements or any of $Ln(OH)_4 \cdot xH_2O$, $LnO_2 \cdot xH_2O$, $[Ln_2O_a(OH)_{4-2a} \cdot xH_2O]_n$ for tetravalent rare earth elements such as Ce, Pr and Tb (a part of Ln may be replaced with the cations as described above, and a part of hydroxide with the anions as described above). In these formulae, Ln indicates a rare earth element, a is an integer from 0 to 3, and x and n are positive integers. Mixtures of these compounds may also be used and mixing ratios are not particularly limited.

These hydroxides or hydrous oxides of rare earth elements can easily be obtained as precipitates by adding an alkaline solution to an aqueous solution of salts of rare earth elements such as the hydrochlorides, sulfates and nitrates thereof and adjusting the pH of the aqueous solution of the salts to at least 7. At this time, the precipitates will adsorb any borate ions, present in the aqueous solution if the pH is from 7 to 11. The precipitates can be provided for use as such in the state of a suspension or as a cake obtained by filtration, or alternatively as powder after drying or as shaped articles in any desired form such as granules, fibers, strands, bands or plates according to the method by supporting the precipitates on a suitable porous carrier. In any case, the properties and the surface condition of the particles of the hydroxide and hydrous oxide of a rare earth element are important for exhibiting the effect of the present invention, and therefore it is preferred to control the amount of structural water or adhesive water, and the particle size and the degree of agglomeration of the particles.

In view of the various standpoints as described above, it is preferred in the preparation of the hydroxide or hydrous oxide of a rare earth element to carry out the dehydrating or drying operation under conditions where no structural water or adhesive water of the particles will be dissipated. For example, the drying operation is conducted preferably at a temperature of about 150° C. or lower, more preferably 100° C. or lower, and the ignition loss is preferably about 35 to about 10% by weight, more preferably about 30 to about 12% by weight. The term "ignition loss" as herein employed means the percent loss in weight after the ignition of dry powder at 600° C.

Further, the particles of the hydroxide or hydrous oxide of a rare earth element should desirably be as fine as possible. More specifically, the average primary particle size of the hydroxide or hydrous oxide preferably ranges from about 0.01 μm to about 2 μm, more preferably from about 0.01 to about 0.5 μm, and also the degree of agglomeration of the particles is preferably as small as about 0.05 to about 20 μm. The average primary particle size and the agglomeration particle sizes are measured by using an electron microscope with 10,000 magnification.

In using the above described hydroxide or hydrous oxide of a rare earth element for the object of the present invention, its handling performance can be effectively enhanced by supporting the hydroxide or hydrous oxide on a suitable porous carrier. Materials which can be used as carriers include various inorganic and organic materials capable of exhibiting the effect of the present invention, but various organic polymeric materials are preferred from the aspects of processability of carriers, strength of carriers, chemical resistance, etc. Examples of such organic polymeric materials include phenol resin, urea resin, melamine resin, polyester resin, diallyl phthalate resin, xylene resin, alkylbenzene resin, epoxy resin, epoxy acrylate resin, silicone resin, urethane resin, fluorine resin, vinyl chloride resin, vinyidene chloride resin, polyethylene, chlorinated polyolefin, polypropylene, polystyrene, ABS resin, polyamide, methacrylic resin, polyacetal, polycarbonate, cellulose type resin, polyvinyl alcohol, polyimide, polysulfone, polyacrylonitrile and copolymers of the monomers included in these resins. Of these organic polymeric materials, it is preferred to use polymers having appropriate water resistance and chemical resistance and high hydrophilicity and capable of forming a porous structure such as polyamide, cellulose type resin, polysulfone, polyacrylonitrile and vinyl chloride-vinyl alcohol copolymer. The carrier having a porous structure obtained from these resins has a sufficient adsorption rate and is suitable for use as a fixed bed or fluidized bed. In particular, when the hydroxide or hydrous oxide of a rare earth element is supported on a resin with high hydrophilicity, it is found to have a surprisingly high characteristic for adsorption and desorption of borate ions, even when the hydroxide or hydrous oxide of a rare earth element is not exposed on the surface of the resin.

The method for supporting the hydroxide or hydrous oxide of a rare earth element on an organic polymeric material may be selected from various known methods. For example, there may be employed the method in which the hydroxide or hydrous oxide of a rare earth element is suspended in a solution of a polymer dissolved in an appropriate solvent and shaped into granules, fibers, strands or bands; the method in which at least one monomer for an appropriate polymer is polymerized in the presence of the particles of the hydroxide or hydrous oxide of a rare earth element; or the method in which an appropriate polymer and various soluble materials are kneaded and molded, followed by extraction of the soluble material wich a suitable solvent to make the polymer porous. In any case, the resultant polymer is required to have a porous structure and can hold the hydroxide or hydrous oxide of a rare earth element in a sufficient amount so that it can not readily be leached out therefrom, and any method may be employed so long as such object can be achieved. Of these methods, a particularly preferred method comprises dissolving a hydrophilic polymer such as polyamide, cellulose type resin, polysulfone, polyacrylonitrile or vinyl chloride-vinyl alcohol resin in a suitable solvent, suspending the hydroxide or hydrous oxide of a rare earth element in the resultant solution and forming the solution into granules using water as a coagulation bath. The granules obtained according to this method have a porous structure, sufficient adsorption rate and physical strength, and therefore they are suitable for adsorption and desorptive regeneration using a fixed bed or a fluidized bed.

In particular, the amount of the polymer employed may be about 5% by weight to about 50% by weight, preferably about 10% weight to about 30% by weight of the hydroxide or hydrous oxide of a rare earth element. Amounts of the polymer lower than about 5% by weight do not exhibit sufficient support for the hydroxide or hydrous oxide and the strength also insufficient.

On the other hand, amounts of higher than about 50% by weight will markedly lower the adsorption rate. The particle size and the void volume of the adsorbent have influences on the adsorbing effect of the present invention. The average particle size is preferably about 0.1 mm to about 5 mm and the void volume is preferably about 0.5 to 0.85.

The void volume as employed herein refers to the percentage of the change in volume from the apparent volume ($V_1$) in dried state to the compressed volume (Vo) on compression under pressurization, namely ($V_1$−Vo) value, relative to the apparent volume $V_1$; that is, ($V_1$−Vo)/$V_1$. The apparent volume ($V_1$) is the volume measured according to the mercury picnometer method, while the compressed volume (Vo) is the volume of a sample of the same weight when molded between press plates at 100° C. under a pressure of 50 kg/cm². With a void volume less than about 0.5, the adsorption rate is too slow, and the strength will be insufficient when the void volume is more than about 0.85.

In the separation of borate ions it is effective for the increase in the adsorbed quantity and the enhancement of selective adsorption in preference over other anions to control the dissociated state of borate ions and the surface potential of the hydroxide or hydrous oxide of a rate earth element by controlling the pH of the aqueous solution containing borate ions. More specifically, borate ions can be separated in high efficiency by maintaining the pH of the aqueous solution containing borate ions at about 5 to about 11.

The borate ion concentration may be within the range from about $10^3$ to about $10^{-3}$ ppm as boron atom to exhibit the effect of the invention, more preferably from about $10^2$ to about $10^{-1}$ ppm, to exhibit particularly markedly the effect of the invention.

The hydroxide or hydrous oxide of a rare earth element of the present invention enables the selective separation of borate ions from water containing borate ions at low concentrations and large amount of various co-existing anions, which has been deemed to be difficult in the prior art. For example, it can selectively adsorb the borate ions at 0.4 mM/liter co-existing with chlorine ions 500 mM/liter as in sea water.

The mechanism by which the hydroxide or hydrous oxide of a rare earth element according to the present invention fixes borate ions has not been clarified so far. The term "adsorption" as herein employed refers to the phenomenon in which borate ions are fixed through physical and chemical interactions between the hydroxide or hydrous oxide of a rare earth element or the surface state thereof in the aqueous solution and borate ions in the aqueous solution.

Adsorption selectivity of the hydroxide or hydrous oxide of a rare earth element for borate ions is more specific as compared to ion exchangers of the prior art. The adsorption characteristics of the hydroxide or hydrous oxide of a rare earth element for various anions depend on the pH value at which it is contacted with the solution to be treated. As for borate ions, in the case of sea water as shown in FIG. 1, a high adsorption capacity is exhibited within the pH range from about 5 to about 11, with its peak being at pH 7 to 10. The adsorption selectivity for the hydroxide or hydrous oxide of a rare earth element is about $10^2$ to $10^4$ times (mole equivalent ratio) as much as that for co-existing chlorine ion, nitrate ion or sulfate ion.

Particularly, the present invention is suitable as a method for selectively and efficiently separating and removing a minute amount of borate ions (ordinarily about 4 to 50 ppm as boron atom) in a large excess of coexisting anions such as in sea water, brine or bittern. In the case of these waters, it is preferred to adjust the pH to about 5 to about 10, particularly to about 7 to about 9.5. At a pH lower than about 5, adsorbability will be markedly reduced to decrease efficiency. On the other hand, at a pH higher than 10 adsorbability is reduced and simultaneously magnesium in the waters will be precipitated as the hydroxide, and boron will coprecipitate as an undesirable impurity.

Also, in separating borate ions from sea water, brine or bittern, it is preferred to previously remove carbonate ion, which, when co-present in such waters, will tend to interfere with the adsorption of borate ions. Removal of the carbonate ion may easily be practiced according to the known method by, for example, adjusting the pH to 4 to 5, followed by aeration or boiling. According to this method, the dissolved carbonate ion concentration of 1.0 mM/liter in ordinary sea water can be reduced to 0.1 mM/liter or lower.

As the method for adsorbing borate ions on the hydroxide or hydrous oxide of a rare earth element, any method may be employed which can bring the hydroxide or hydrous oxide of a rare earth element into contact with the water containing borate ions dissolved therein. For example, there may be effectively employed a method, in which a suspension, cake, powder or shaped article of the hydroxide or hydrous oxide of a rare earth element is added to the water to be contacted therewith; a method in which said water is passed through a column filled with granules or powder of the hydroxide or hydrous oxide of a rare earth element; and a method in which shaped articles in the form of fibers, strands or bands of the hydroxide or hydrous oxide of a rare earth element are immersed in the water. Also, after a water-soluble salt of a rare earth element is dissolved in the water, the precipitates of the hydroxide or hydrous oxide of a rare earth element may be formed by adjusting the pH to 5 or higher, preferably 7 or higher, for the adsorption of borate ions dissolved in the water.

The temperature at which the above described adsorption operation is conducted will have an influence on the adsorption rate, and heating is effective for this purpose. However, even at normal temperature (5° C. to 35° C.) the adsorption rate is practically satisfactory, and the temperature is practically about 5° C. to about 90° C., preferably about 20° C. to about 60° C.

The contact time depends on the method of contact, physical conditions and the state of the hydroxide or hydrous oxide of a rare earth element. While it will take about 10 seconds to acout 3 days before the adsorption amount reaches saturation, practically, the contact time may be generally from about 0.2 to about 60 minutes. The conditions of temperature and time may also be adapted for the desorption and regeneration operations as hereinafter described.

The amount of the hydroxide or hydrous oxide of a rare earth element which can be employed may be set at an appropriate amount depending on the initial concentration and the target concentration to be reached, since there is a correlation of the Freundlich type adsorption formula: $Q=KC^\alpha$ (Q: amount adsorbed, K: proportional coefficient, C: concentration, $\alpha$: powder coefficient) between the saturated adsorption amount per unit amount of the hydroxide or hydrous oxide of a rare earth element and the concentration of boric acid in the solution. A preferred amount of the hydroxide or hydrous oxide of a rare earth element is about 0.1 to about 10 Kg/m³ water. For example, when borate ions in sea water (ordinarily 4 to 5 ppm as boron atom) are removed with the use of a hydrous oxide slurry of Ce(IV), the slurry may be added in an amount of about 3 to about 1 kg-hydrous oxide/m³-sea water to reduce the concentration to 1 to 0.05 ppm as boron atom.

The hydroxide or hydrous oxide of a rare earth element having adsorbed borate ions thereon according to the method as described above can also be subjected to desorption and regeneration according to an appropriate method such as by controlling pH, addition of a salt, etc. The regenerated hydroxide or hydrous oxide of a rare earth element can be reused to repeat adsorption separation. The above described desorption can be performed by contacting the adsorbed hydroxide or hydrous oxide of a rare earth element with an aqueous solution having a pH of about 12 to about 14 and pH 2 to 4. The desorbing solution is an aqueous alkaline solution, and the alkali species which can be employed include inorganic alkalis such as ammonium hydroxide, potassium hydroxide, sodium hydroxide, calcium hydroxide and the like, organic amines such as primary, secondary and tertiary alkylamines comprising methylamine, dimethylamine, trimethylamine and hydroxyalkylamines comprising triethanolamine and others. Of these alkalis, sodium hydroxide has a large desorption efficiency and is, therefore, particularly preferred. The concentration of the alkali may be within the range from 0.5 to 1000 mM/liter, preferably from 10 to 500 mM/liter. Also, for hardly soluble and relatively stable hydroxides or hydrous oxides of rare earth elements as represented by the hydroxide or hydrous oxide of Ce(IV), they can be desorbed by contact with an aqueous solution having a pH of about 2 to about 4. The aqueous solution for desorption may preferably permit at least one anion selected from the group consisting of inorganic anions such as halogen anions, sulfate anion, nitrate anion, phosphate anion and organic anions such as oxalate anion and acetate anion to be co-present therein. In particular, fluorine ion and sulfate ion are preferred for their great desorption effects. The concentration of these anions which may differ depending on the ion species, is appropriately about 0.5 to about 1000 mM/liter. For example, in the case of sulfate ion the concentration may be about 10 to about 500 mM/liter. At a pH of about 4 to 12, the desorption efficiency is lower, and the hydroxide or hydrous oxide of rate earth element will be markedly dissolved at less than about pH 2.

The present invention provides a process for the selective adsorption separation of borate ions dissolved in water, which comprises contacting the borate ion-containing water having a pH of about 5 to about 11 with an adsorbent comprising a hydroxide or a hydrous oxide of a rare earth element and separating the adsorbent having the borate ions adsorbed thereon from the water. According to a preferred embodiment of the invention, the adsorbent having the borate ions adsorbed thereon is further contacted with an aqueous solution having a pH of about 2 to about 4 or a pH of about 12 to about 14 thereby to desorb the borate ions for regeneration and reuse of the adsorbent.

The present invention is described in more detail by referring to the following examples, but is not deemed to be limited thereto.

In the specification, the equilibrated amount adsorbed, removal percentage and desorption percentage were determined from the following equations:

$$\text{Equilibrated amount adsorbed} = \frac{\left( \begin{array}{c} [\text{Initial conc. } B_2O_3 \text{ mg/l}] \times \\ [\text{Conc. after adsorption } B_2O_3 \text{ mg/l}] \end{array} \right)}{\text{Amount of hydroxide or hydrous oxide of rare earth element added per unit volume (g/l)}}$$

($B_2O_3$ mg/g hydroxide or hydrous oxide of rare earth element)

$$\text{Removal percentage (\%)} = \left( 1 - \frac{[\text{Conc. after adsorption (mg/l)}]}{[\text{Initial conc. (mg/l)}]} \right) \times 100$$

$$\text{Desorption percentage (\%)} = \frac{\{[\text{Liquid amount (l)}] \times [\text{Borate conc. (mg/l)}]\}}{\left( \begin{array}{c} [\text{Amount of hydroxide or hydrous oxide of rare earth element (g)}] \times \\ [\text{Equilibrated amount adsorbed}] \text{ (mg/g)} \end{array} \right)} \times 100$$

EXAMPLES 1 & 2 AND COMPARATIVE EXAMPLES 1 TO 3

To a sample of water having a pH of 5.4 prepared by dissolving boric acid (special reagent grade) in distilled water to a boron atom content of 45 ppm was added each of Ce hydrous oxide and Y hydroxide at in a proportion of 4 g/liter, and the mixture was stirred at 30° C. The boron concentration in the sample after 2 hours was measured by ICP (radio frequency inductive coupled plasma emission analysis, by means of JY-48 Model, produced by JOBIN YVON Co.) to determine equilibrated amount adsorbed and removal percentage. The results are shown in Table 1.

Ce hydrous oxide: Cerium chloride was dissolved in distilled water and aqueous hydrogen peroxide in an amount equimolar to cerium was added, followed by stirring. Then, ammonia water was added to adjust the pH to 9. The mixture was thereafter heated to 85° C. to decompose excess hydrogen peroxide and aged overnight, followed by filtration to provide a cake as the sample. The particle size of this sample was found to be 0.08 μm as the primary particle, and 0.4 μm on an average as the agglomerated particle.

Y hydroxide: Yttrium chloride was dissolved in distilled water, followed by addition of ammonia water to adjust pH to 9. After aging overnight, the mixture was filtered to provide a cake as the sample. The particle size of this sample was found to be 0.06 μm as the primary particle, and 0.2 μm on an average as the agglomerated particle.

As Comparative Examples 1 to 3, Mg hydroxide, Zr hydrous oxide and guar gum resin were tested similarly as in Examples 1 and 2 to determine the amounts adsorbed. Zr hydrous oxide was prepared from zirconium oxychloride similarly as in the case of Y, and Mg hydroxide was prepared in the same manner as in the case of Y except for adding sodium hydroxide for adjustment of the pH to 10.5.

TABLE 1

|  | Kind | Removal percentage | Equilibrated amount adsorbed ($B_2O_3$ mg/g adsorbent) |
|---|---|---|---|
| Example - 1 | Ce | 89% | 32.2 |
| Example - 2 | Y | 66% | 23.9 |
| Comparative Example - 1 | Mg | 10% | 3.6 |
| Comparative Example - 2 | Zr | 28% | 10.2 |
| Comparative Example - 3 | Guar gum resin | 12% | 4.4 |

EXAMPLES 3 & 4 AND COMPARATIVE EXAMPLES 4 & 5

Sea water was employed as the aqueous borate ion-containing solution in these examples. The pH of the sea water (boron conc. 4.5 ppm) was previously adjusted to 3 for removal of carbonate ion, then adjusted to 9 with aqueous sodium hydroxide and the same hydrous oxide as in Example 1 was added, followed by stirring at 30° C. The hydrous oxide of the rare earth element and other conditions were the same as in Examples 1 and 2 except for changing the amount of the metal hydroxide or oxide per unit liquid volume to 1 g/liter. As Comparative Examples 4 and 5, there are shown the results of the tests conducted for the Mg hydroxide and Zr hydrous oxide prepared similarly as in Comparative Examples 1 and 2. In these experiments, when the concentrations of Na, Ca, Mg and chlorine ion, sulfate ion were compared to those before the treatment, there was no significant difference, with the precision of the analytical limit (99%).

TABLE 2

|  | Kind of metal hydroxide or hydrous oxide | Removal percentage |
|---|---|---|
| Example - 3 | Ce | 80% |
| Example - 4 | Y | 65% |
| Comparative Example - 4 | Mg | 25% |
| Comparative Example - 5 | Zr | 38% |

EXAMPLES 5 TO 9 AND COMPARATIVE EXAMPLES 6 TO 9

In these examples, the hydrous oxides of rare earth elements were formed by dissolving water-soluble salts of rare earth elements in borate ion-containing aqueous solutions.

In decarbonated sea water, chlorides of rare earth elements were dissolved in amounts corresponding to 1 g of the hydroxides of rare earth elements per liter of sea water, followed by addition of ammonia water to adjust the pH to 9 to form precipitates, which were mixtures of hydroxides and hydrous oxides of rare earth elements. After the mixture was left to stand at 20° C. for 30 minutes, the supernatant of the sea water was collected and the boron concentration was measured by means of ICP to determine removal percentage.

As Comparative Examples 6 to 9, the same tests were conducted for Mg, Al, Fe and Ti (for Mg, precipitates were formed by adding 1.1 times as much as the theoretical amount of ammonia water corresponding to the Mg salt). The results are shown in Table 3. In these experiments, when the concentrations of Na, Ca, Mg and chlorine ion, sulfate ion were compared with those before the treatment, there was no significant difference, with the precision of the analytical limit (99%).

TABLE 3

|  | Kind of hydrous oxide | Removal Percentage |
|---|---|---|
| Example - 5 | La | 76% |
| Example - 6 | Ce | 80% |
| Example - 7 | Sm | 68% |
| Example - 8 | Gd | 62% |
| Example - 9 | Y | 65% |
| Comparative Example - 6 | Mg | 34% |
| Comparative Example - 7 | Al | 14% |
| Comparative Example - 8 | Ti | 8% |
| Comparative Example - 9 | Fe | 10% |

EXAMPLES 10 TO 13

In these examples, mixed rare earth compounds were used for the separation of borate ions in sea water. Each of commercially available rare earth chloride, Ce concentrate, Y concentrate, Sm-Gd concentrate as shown in Table 4 was dissolved in distilled water or sulfuric acid, and the total concentration of the rare earth elements was adjusted to 500 mM/liter to provide a stock rare earth solution. The stock rare earth solution was added to decarbonated sea water in an amount corresponding to the hydroxide of 1 g/liter, followed by the same procedure as in Examples 5 to 9, to form precipitates of the hydrous oxide, and the removal percentage of borate ions was determined. The results are shown in Table 5. In these experiments, when the concentrations of Na, Ca, Mg and chlorine ion, sulfate ion were compared to those before the treatment, there was no significant difference, with the precision of the analytical limit (99%).

TABLE 4

| | Compositions of rare earth elements (calculated as oxides) | | | |
|---|---|---|---|---|
| | Rare earth chloride (produced in China) wt % | Ce concentrate (produced in India) wt % | Y concentrate (produced in Malaysia) wt % | Sm—Gd concentrate (produced in China) wt % |
| $La_2O_3$ | 25.15 | 11.0 | 1.44 | 0.40 |
| $Ce_2O_4$ | 51.91 | 84.0 | 1.18 | 0.65 |
| $Pr_6O_{11}$ | 5.12 | 2.0 | 0.36 | 0.68 |
| $Nd_2O_3$ | 16.07 | 3.0 | 1.56 | 5.43 |
| $Sm_2O_3$ | 1.02 | — | 1.06 | 52.48 |
| $Eu_2O_3$ | 0.19 | — | 0.07 | 1.82 |
| $Gd_2O_3$ | 0.17 | — | 3.39 | 26.32 |
| $Tb_2O_{3-3}$ | — | — | 0.76 | 1.27 |
| $Y_2O_3$ | 0.04 | — | 68.45 | 6.27 |
| $Dy_2O_3$ | — | — | 7.55 | 2.77 |
| $Ho_2O_3$ | — | — | 1.51 | 0.24 |
| $Er_2O_3$ | — | — | 6.54 | 0.56 |
| $Tm_2O_3$ | — | — | 0.90 | 0.17 |
| $Yb_2O_3$ | — | — | 5.08 | 0.50 |

TABLE 4-continued

| | Compositions of rare earth elements (calculated as oxides) | | | |
|---|---|---|---|---|
| | Rare earth chloride (produced in China) wt % | Ce concentrate (produced in India) wt % | Y concentrate (produced in Malaysia) wt % | Sm—Gd concentrate (produced in China) wt % |
| $Lu_2O_3$ | — | — | 0.15 | 0.44 |

TABLE 5

| | Mixed rare earth compound | Removal percent |
|---|---|---|
| Example 10 | Rare earth chloride | 69% |
| Example 11 | Ce concentrate | 71% |
| Example 12 | Y concentrate | 65% |
| Example 13 | Sm—Gd concentrate | 63% |

EXAMPLE 14

To one liter of decarbonated sea water (sea water having the same composition as used in Example 3: boron conc. 4.5 ppm, 0.4 mM/liter as $H_2BO_3^-$, sulfate ion conc. 110 mM/liter and chlorine ion conc. 530 mM/liter) was added 1 g of the Ce(IV) hydrous oxide as prepared in Example 1. The pH of the solution was adjusted with hydrochloric acid or sodium hydroxide to 3 to 10.5, followed by stirring at 20° C. The boron concentration in the sea water after 2 hours was determined and the adsorbed material was subjected to desorption with a 0.2N alkali solution, and the sulfate ion concentration and chlorine ion concentration were measured to determine the amounts of borate ions, sulfate ion and chlorine ion adsorbed. FIG. 1 shows the results.

EXAMPLE 15

In this example Ce(IV) hydrous oxide was used as the adsorbent and reused after desorption.

The Ce(IV) hydrous oxide having borate ions adsorbed thereon similarly as in Example 3 was suspended in distilled water at a proportion of 2 wt. %, and an aqueous sodium hydroxide solution was added to the suspension to adjust the pH to 12 to 13.5, followed by stirring. After 2 hours, the boron concentration in the liquid was measured to determine desorption percentage. Then, the Ce(IV) was desorbed at pH 13, the same procedure as in Example 3 was repeated and the equilibrated amount adsorbed and the removal percentage of borate ions were determined.

In these experiments, when the concentrations of Na, Ca, Mg and chlorine ions, sulfate ions were compared to those before the treatment, there was no significant difference, with the precision of the analytical limit (99%).

Figure 2:
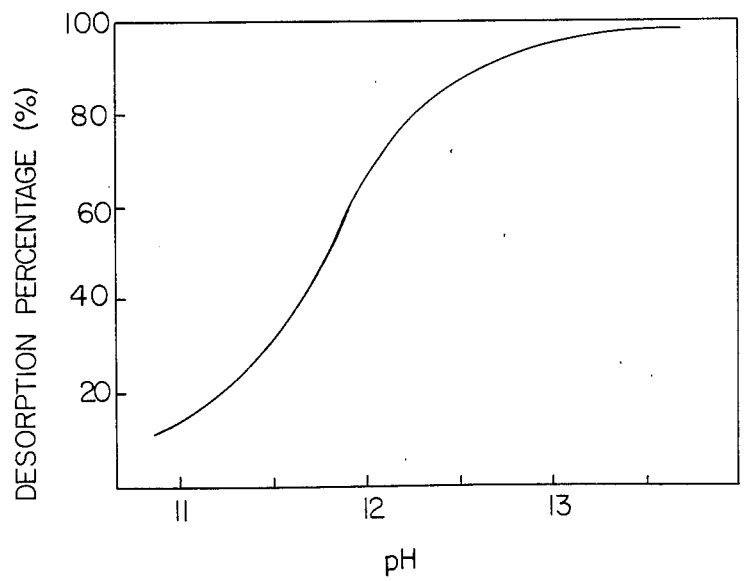
FIG. 2 shows the relation between the pH of the solution for desorbing borate ions from the hydrous cerium (IV) oxide having borate ions adsorbed thereon and the desorption percentage.

FIG. 2 shows the relation between desorption percentate and pH, and the equilibrated amount and the removal percentage during reuse are shown in Table 6.

TABLE 6

| | | Removal percentage | Equilibrated amount adsorbed (mg-$B_2O_3$/g absorbent) mg/g | Desorption percentage |
|---|---|---|---|---|
| Example 3 | [First use] | 80% | 11.6 | 95% |
| Example | [Reuse | 78% | 11.8 | |

TABLE 6-continued

| | | Removal percentage | Equilibrated amount adsorbed (mg-$B_2O_3$/g absorbent) mg/g | Desorption percentage |
|---|---|---|---|---|
| 15 | after desorption] | | | |

Example 16 & 17

In these examples, borate ions in brine and bittern were adsorbed by use of Ce(IV) hydrous oxide, followed by desorption.

To each of brine (10° Bé, boron atom conc. 13 ppm) obtained by the concentration of natural sea water as shown in Table 7 and bittern (33° Bé, boron atom conc. 44 ppm), the Ce(IV) hydrous oxide as prepared in Example 1 was added to each of them in a proportion of 67 mg/$B_2O_3$—mg and removal percentage was determined. Before use, the brine and the bittern were decarbonated and adjusted to pH 9.0 with an aqueous caustic soda solution. Then, the Ce hydrous oxide having adsorbed borate ions thereon was filtered off and added in 1 W/V % an aqueous sodium sulfate solution having a concentration of 30 mM/liter whose pH was adjusted to 2.0 with HCl, followed by stirring to effect desorption. The results are shown in Table 8.

TABLE 7

| | Component | | | | | | Total salt content wt % |
|---|---|---|---|---|---|---|---|
| | $CaSO_4$ | $MgSO_4$ | $MgCl_2$ | $MgBr_2$ | KCl | NaCl | |
| Example 16 brine | 0.4% | 0.6% | 0.9% | 0.0% | 0.2% | 7.4% | 9.5% |
| Example 17 bittern | — | 8.0% | 12.9% | 0.3% | 2.4% | 8.6% | 32.2% |

TABLE 8

| | | Removal percentage | Equilibrated amount adsorbed ($B_2O_3$—mg/g-adsorbent) | Desorption percentage |
|---|---|---|---|---|
| Example 16 | brine | 86% | 12.9 | 95% |
| Example 17 | bittern | 92% | 13.7 | 94% |

EXAMPLES 18 TO 21

In these examples, Ce(IV) hydrous oxide was desorbed with an alkaline aqueous solution and then subjected to re-adsorption.

The Ce(IV) hydrous oxide having borate ions adsorbed similarly as in Example 3 was suspended in an aqueous alkaline solution having a pH as indicated in Table 9, at a proportion of 2 W/V % at 50° C. After 2 hours, the borate concentration in the solution was measured to determine desorption percentage. Next, following the same procedure as in Example 3, readsorption was effected and removal percentage was determined. During the re-adsorption, the pH of the suspension was adjusted to 9.

In these experiments, when the concentration of Na, Ca, Mg and chlorine ion and sulfate ion were compared to those before treatment, there was no significant difference, with the precision of the analytical limit (99%).

The results are shown in Table 9.

TABLE 9

|  | Alkali | pH | Desorption percentage | Removal percentage during reuse |
|---|---|---|---|---|
| Example 18 | NaOH | 12.8 | 92% | 75% |
| Example 19 | KOH | 12.8 | 80% | 65% |
| Example 20 | Ca(OH)$_2$ | 12.8 | 36% | 30% |
| Example 21 | NH$_4$OH | 11.5 | 20% | 17% |

EXAMPLE 22

Ce(IV) hydrous oxide granulated with a polyacrylonitrile resin was employed for the adsorption of borate ions in sea water, and further adsorption was conducted after desorption.

PREPARATION OF GRANULES

Polyacrylonitrile was dissolved in dimethylformamide at a concentration of 10 wt.%, and to the solution the Ce(IV) hydrous oxide (powder obtained by drying the cake of Example 1, ignition loss 18.5 wt.%, average particle size as the agglomerated particle: $0.8\mu$) was added in an amount 5 times as much as the weight of the polymer, followed by sufficient stirring to effect dispersion. The resultant mixture was granulated in water as a coagulating bath.

The granules (size 1.0–0.5 mm $\phi$, void volume 0.65) were packed in a glass column to a bulk volume of 20 ml (8.0 g of Ce(IV) hydrous oxide). Sea water of 30° C. previously decarbonated by adjustment of the pH to 3 with HCl and aeration, followed by readjustment to pH 9 with addition of saturated Ca(OH)$_2$ solution, was passed through the above packed column at a rate of 400 ml/hour for 12 hours. The boron concentration in said sea water was initially 14 ppm as B$_2$O$_3$. The borate concentration in the sea water at the column outlet and the total borate concentration in the total amount of the sea water 4.8 were measured to determine the outlet concentration and the total amount adsorbed (Adsorption 1).

Subsequently, through the column after the adsorption, distilled water was passed at a rate of 400 ml/hour to replace sea water, and then a 0.1N aqueous NaOH solution (pH 13) was passed at a rate of 30 ml/hour for 6 hours. The borate concentration in 180 ml of the aqueous NaOH effluent from the column was measured to determine the total amount desorbed and the desorption percentage (Desorption 1).

Next, the granule after the above desorption was taken out, washed with water to remove the alkali components attached, and then packed again in the column. The same decarbonated sea water as described above was passed through the column, and the outlet concentration and the total amount adsorbed after 12 hours were determined (Adsorption 2).

Subsequently, an aqueous Na$_2$So$_4$ solution having a concentration of 30 mM/liter whose pH was adjusted to 2 with HCl was passed through the column at a rate of 400 ml/hour for 6 hours. The borate concentration in the aqueous Na$_2$SO$_4$ effluent from the column was measured to determine total amount desorbed and the desorption percentage (Desorption 2).

Further, the granules after the desorption were taken out, immersed in 200 ml of an aqueous NaOH solution having a pH of 12 for one hour to adjust the pH of the liquid phase to 9, and then packed again in the column. Again, the decarbonated sea water was passed similarly as described above to have borate ions adsorbed, and the outlet concentration and the total amount adsorbed were measured after 12 hours (Adsorption 3).

In these experiments, when the concentrations of Na, Ca, Mg and chlorine ion, sulfate ion were compared to those before the treatment, there was no significant difference, with the precision of the analytical limit (99%).

TABLE 10

|  | Outlet B$_2$O$_3$ conc. after 12 hours | amount absorbed |  | Total amount desorbed | Desorption percentage |
|---|---|---|---|---|---|
| First adsorption (Adsorption 1) | 1.2 | 64.3 mg (8.0 mg/g-*Ce) | Desorption with NaOH (Desorption 1) | 62.4 mg | 97% |
| Readsorption after desorption with NaOH (Adsorption 2) | 1.3 | 63.8 mg (8.0 mg/g-Ce) | Desorption with Na$_2$SO$_1$ (Desorption 2) | 62.5 mg | 98% |
| Readsorption after desorption with NaSO$_4$ (Adsorption 3) | 1.1 | 64.6 mg (8.1 mg/g-Ce) |  |  |  |

*mg-B$_2$O$_3$/g-Ce(IV) hydrous oxide

EXAMPLE 23

Ce(IV) hydrous oxide was added to natural sea water which had not been subjected to decarbonation treatment to effect adsorption.

Example 3 was repeated except that natural sea water without decarbonation was used after adjustment of the pH to 9. The results are shown in Table 11 together with Example 3. Quantitative determination of carbonate ion was conducted by anion chromatography.

TABLE 11

|  |  | Carbonate ion conc. | Removal percentage | Equilibrated amount adsorbed (B$_2$O$_3$—mg/g-adsorbent) |
|---|---|---|---|---|
| Example 3 | Decarbonated sea water | 0.09 mM/l | 80% | 11.6 |
| Example 23 | Natural sea water | 11 mM/l | 51% | 7.4 |

As described above, according to the present invention, borate ions can be separated from water containing borate ions at a low concentration such as sea water, brine or bittern with good selectivity and at high efficiency, and further the hydroxide and the hydrous oxide of a rare earth element can be easily regenerated for reuse. Therefore, the present invention is very suitable for commercial processes for the separation and reoval of borate ions.

The process of the present invention can be applied in the field of industry where absence of borate ions in water is required such as in the case of production of high purity magnesium hydroxide from sea water, brine or bittern.

While the invention has been described in detail and with reference to a specific embodiment thereof, it will be apparent to one skilled in the art that various changes and modifications can be made therein without departing from the spirit and scope thereof.

We claim:

1. A spherical particle which comprises a hydroxide or a hydrous oxide of a rare earth element supported on a porous carrier made of a hydrophilic organic polymer, the amount of the hydrophilic organic polymer being 5% by weight to about 50% by weight of the hydroxide or the hydrous oxide of the rare earth element.

2. The spherical particle of claim 1 having a porosity of 0.5 to 0.85 and an average particle diameter of 0.1 mm to 5 mm.

3. The spherical particle of claim 1, wherein the rare earth element is at least one metal selected from the group consisting of Y, La, Ce, Pr, Nd, Pm, Sm, Eu, Gd, Tb, Dy, Ho, Er, Tm, Yb and Lu.

4. The spherical particle of claim 3, wherein the rare earth element is Ce.

5. The spherical particle of claim 3, wherein the rare earth element is La.

6. The spherical particle of claim 1, wherein the hydrophilic polymer is selected from the group consisting of polyacrylonitrile, polyamide, cellulose resin, polysulfone and vinyl chloride-vinylalcohol copolymer.

* * * * *